United States Patent
Saigo et al.

(10) Patent No.: US 9,575,327 B2
(45) Date of Patent: Feb. 21, 2017

(54) STEREOSCOPIC IMAGE VIEWING EYEWEAR AND METHOD FOR CONTROLLING THE VIEWING OF STEREOSCOPIC IMAGES BASED ON A DETECTED DISTANCE BETWEEN A DISPLAY DEVICE AND THE EYEWEAR

(71) Applicant: PANASONIC CORPORATION, Osaka (JP)

(72) Inventors: Katsuo Saigo, Hyogo (JP); Kazuo Okamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 688 days.

(21) Appl. No.: 13/799,065

(22) Filed: Mar. 13, 2013

(65) Prior Publication Data

US 2013/0194663 A1   Aug. 1, 2013

Related U.S. Application Data

(63) Continuation of application No. PCT/JP2011/005086, filed on Sep. 9, 2011.

(30) Foreign Application Priority Data

Sep. 14, 2010  (JP) ................. 2010-205112

(51) Int. Cl.
*G02B 27/22* (2006.01)
*H04N 13/04* (2006.01)

(52) U.S. Cl.
CPC ...... *G02B 27/2228* (2013.01); *H04N 13/0438* (2013.01); *H04N 13/0452* (2013.01); *H04N 13/0497* (2013.01); *H04N 2213/008* (2013.01)

(58) Field of Classification Search
CPC ..... G02B 27/22; G02B 27/2214; G02B 27/26; G02B 27/2264; G02B 27/2228; G02B 27/02; G02B 27/021; G02B 27/022; H04N 2213/00; H04N 2213/002; H04N 2213/003; H04N 2213/005; H04N 2213/008; H04N 13/0404; H04N 13/0497; H04N 13/0409; H04N 13/0434; H04N 13/0454; H04N 13/0438; H04N 13/0422; H04N 13/0429; H04N 13/0452; H04N 13/0456; H04N 13/0468; H04N 13/0472; H04N 13/0484; H04N 13/0436; H04N 13/0475; H04N 13/047
See application file for complete search history.

(56) References Cited

U.S. PATENT DOCUMENTS

| 5,293,227 A | 3/1994 | Prince |
| 6,198,484 B1 | 3/2001 | Kameyama |

(Continued)

FOREIGN PATENT DOCUMENTS

| EP | 0 817 123 | 1/1998 |
| EP | 0 935 154 | 8/1999 |

(Continued)

OTHER PUBLICATIONS

International Preliminary Report on Patentability and Written Opinion of the International Searching Authority issued Apr. 9, 2013 in International (PCT) Application No. PCT/JP2011/005086.

(Continued)

*Primary Examiner* — Stephone B Allen
*Assistant Examiner* — Jyotsna Dabbi
(74) *Attorney, Agent, or Firm* — Wenderoth, Lind & Ponack, L.L.P.

(57) ABSTRACT

Stereoscopic image viewing eyewear includes a left-eye shutter that controls a visual field of a viewer's left eye, a (Continued)

right-eye shutter that controls a visual field of a viewer's right eye, a distance determiner that detects a distance between the display device and the eyewear and determines whether the detected distance is smaller than a predetermined value, and a shutter controller that controls open and close of the left-eye shutter and the right-eye shutter based on the determined result of the distance determiner to cause the viewer to view the stereoscopic image when the detected distance is larger than a predetermined value, and to cause the viewer to view a non-stereoscopic image when the detected distance is smaller than the predetermined value.

1 Claim, 8 Drawing Sheets (56) References Cited

U.S. PATENT DOCUMENTS

| | | | |
|---|---|---|---|
| 6,215,590 B1* | 4/2001 | Okano | 359/464 |
| 2010/0007582 A1 | 1/2010 | Zalewski | |
| 2010/0157425 A1 | 6/2010 | Oh | |
| 2012/0050509 A1 | 3/2012 | Suzuki | |

FOREIGN PATENT DOCUMENTS

| | | |
|---|---|---|
| EP | 2 202 991 | 6/2010 |
| JP | 5-153045 | 6/1993 |
| JP | 10-83460 | 3/1998 |
| JP | 11-234703 | 8/1999 |
| JP | 2010-154533 | 7/2010 |
| JP | 2012-049987 | 3/2012 |

OTHER PUBLICATIONS

International Search Report issued Dec. 6, 2011 in International (PCT) Application No. PCT/JP2011/005086 with English translation.

Marc Lambooij et al., "Stereoscopic Displays and Visual Comfort: A Review", The International Society for Optical Engineering, SPIE Newsroom, 10.1117/2.1200703.0648, pp. 1-3, 2007.

\* cited by examiner

STEREOSCOPIC IMAGE VIEWING EYEWEAR AND METHOD FOR CONTROLLING THE VIEWING OF STEREOSCOPIC IMAGES BASED ON A DETECTED DISTANCE BETWEEN A DISPLAY DEVICE AND THE EYEWEAR

CROSS-REFERENCE TO RELATED APPLICATIONS

This is a continuation application of International Application No. PCT/JP2011/005086, with an international filing date of Sep. 9, 2011, which claims priority of Japanese Patent Application No.: 2010-205112 filed on Sep. 14, 2010, the content of which is incorporated herein by reference.

BACKGROUND

1. Technical Field

The technical Field relates to stereoscopic image viewing eyewear that is worn on a viewer for viewing a stereoscopic image.

2. Related Art

In recent years, stereoscopic image display devices for stereoscopically displaying still images and moving images are rapidly spreading due to factors such that development of their manufacturing technique reduces their price, the liquid crystal display devices are thinned and are lightweight, and image quality heightening technique in a display function is developed. Such stereoscopic image display devices are being widely applied to monitors of personal computers and digital TVs or the like for receiving digital broadcasting waves and performing display.

Variety of display systems of the stereoscopic image display devices are present, and most of them utilize parallax between human's right and left eyes to allow viewers to recognize a stereoscopic effect of displayed images. A conventional stereoscopic image display system includes a stereoscopic image display device for displaying right and left images alternately, and stereoscopic image viewing eyewear for receiving a synchronizing signal generated from this display device, and opening and closing left and right shutters in synchronization with the synchronizing signal.

U.S. Pat. No. 5,293,227 discloses control to be performed when the stereoscopic image viewing eyewear cannot receive a synchronizing signal in such a stereoscopic image display system. Specifically, in the control method disclosed in U.S. Pat. No. 5,293,227, when the stereoscopic image viewing eyewear cannot receive a synchronizing signal, the left and right shutters are simultaneously controlled to open or close.

The stereoscopic image viewing eyewear disclosed in U.S. Pat. No. 5,293,227 include a phase-locked loop that synchronizes synchronizing signals received by an infrared receiver, a mode control logic, a voltage controller that is controlled by the mode control logic and controls a voltage, and a driver that is controlled by the mode control logic and drives a right-eye LCC and a left-eye LCC. In the control of the stereoscopic image viewing eyewear, synchronizing signals received by the receiver are synchronized in the phase locked loop VCO, and the driver is driven based on a control instruction of the mode control logic. The driver drives the right-eye LCC and the left-eye LCC. The mode control logic changes a voltage by means of control of the phase locked loop VCO and switching of power from a battery. As a result, the stereoscopic image viewing eyewear simultaneously open and close the left and right shutters to allow a user with the eyewear to view non-stereoscopic images.

Figure 8:
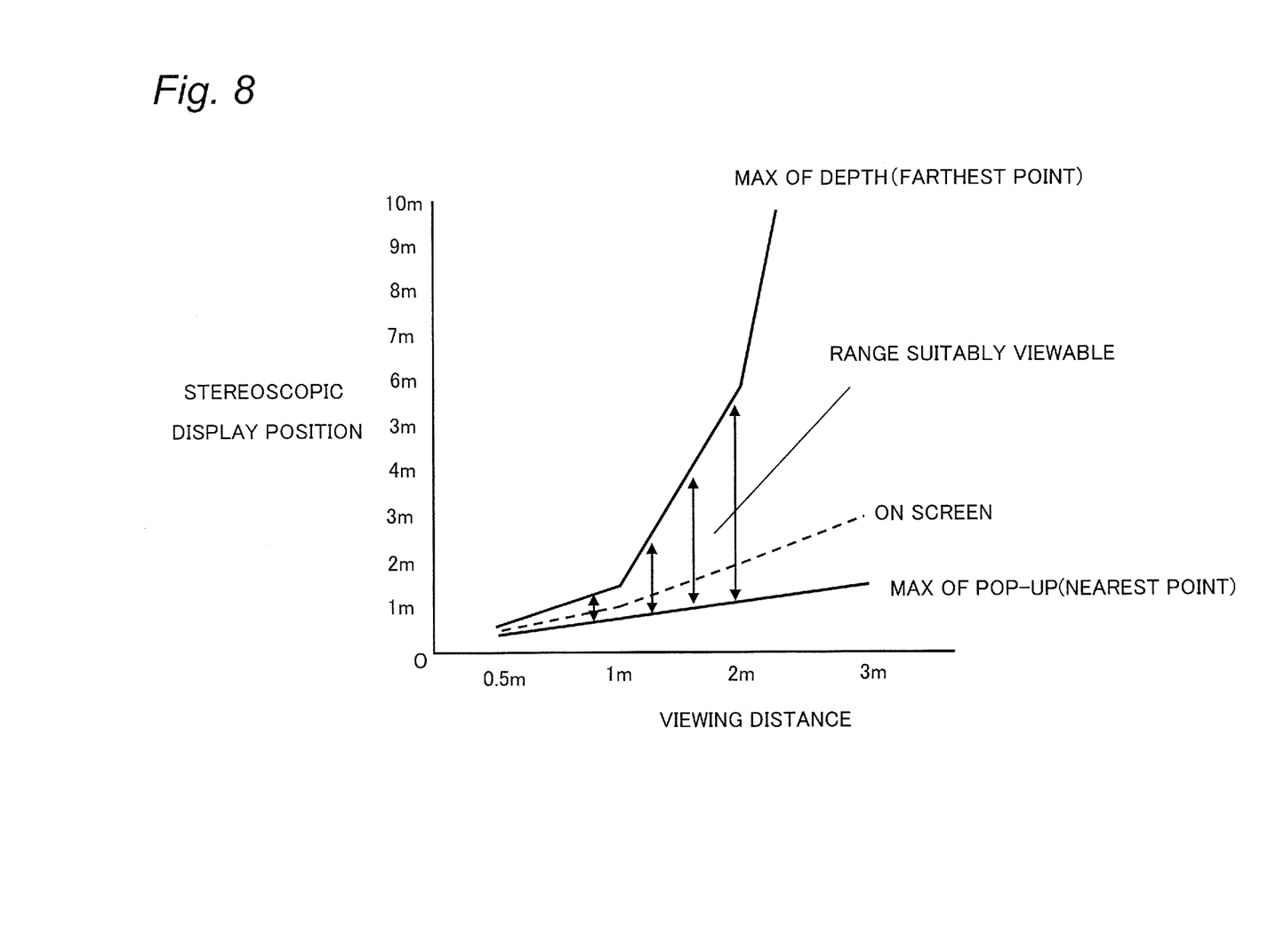
FIG. 8 is a diagram describing a relationship between a distance from the stereoscopic image display device to the viewer and a range in a depth-wise direction (a direction vertical to a display screen) where the viewer can suitably view an object in a stereoscopic vision.

Incidentally, in the stereoscopic image display system, it is known that a display range of an object to be suitably viewed by a viewer in stereoscopic vision (a range of a direction perpendicular to display screen) changes according to a distance between the stereoscopic image display device and the viewer (refer to Non-Patent Document "Stereoscopic displays and visual comfort: a review", Marc Lambooij, et al., 10.1117/2. 1200703.0648, SPIE Newsroom). FIG. 8 is a diagram describing a relationship between the distance from the stereoscopic image display device to the viewer and the display range of an object to be suitably viewed by the viewer in the stereoscopic vision. As shown in FIG. 8, the longer the distance from the stereoscopic image display device to the viewer becomes, the wider the display range of the object to be suitably viewed by the viewer in the stereoscopic vision becomes.

SUMMARY

In other words, the shorter the distance from the stereoscopic image display device to the viewer becomes, the narrower the display range of an object to be suitably viewed by the viewer in the stereoscopic vision becomes. That is, when the viewer gets too near to the stereoscopic image display device, the viewer cannot suitably view a stereoscopic image. For example, in FIG. 8, when the distance from the stereoscopic image display device to the viewer is within 0.5 m, the viewer nearly cannot obtain a suitably stereoscopic vision. That is, even in a case where the stereoscopic image display device displays a stereoscopically viewable image, when the stereoscopic image display device is too close to the viewer, the display range of an object to be stereoscopically viewable by the viewer becomes narrow. For this reason, the stereoscopic image is difficult to be viewed, and convenience of the viewer in the viewing of an image is deteriorated.

The conventional technique described in U.S. Pat. No. 5,293,227 can be applied to a case where the viewer is separated too much from the stereoscopic image display device and thus a synchronizing signal cannot be received. However, when the viewer get too near to the stereoscopic image display device, the conventional technique described in U.S. Pat. No. 5,293,227 cannot stop the viewing of a stereoscopic image, and thus a problem of the deterioration in the viewer's convenience in the viewing of stereoscopic images cannot be solved.

The present disclosure provides stereoscopic image viewing eyewear that can improve user's convenience at the time of viewing stereoscopic images.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

The present disclosure provides stereoscopic image viewing eyewear for enabling a viewer to view a stereoscopic image based on an image displayed on a display device. The eyewear includes a left-eye shutter for controlling a visual field of a viewer's left eye, a right-eye shutter for controlling a visual field of a viewer's right eye, a distance determiner for detecting a distance between the display device and the eyewear and determining whether the detected distance is smaller than a predetermined value, and a shutter controller that controls open and close of the left-eye shutter and the right-eye shutter based on the determined result of the distance determiner to cause the viewer to view the stereoscopic image when the detected distance is larger than a predetermined value, and to cause the viewer to view a non-stereoscopic image when the detected distance is smaller than the predetermined value.

According to the present disclosure, when the viewer wearing the stereoscopic image viewing eyewear gets too near to the stereoscopic image display device to view a stereoscopic image, the viewing of the stereoscopic image is automatically stopped to cause so that the viewer views a non-stereoscopic image. As a result, since the viewer to view a non-stereoscopic image in a viewing distance where a stereoscopic image cannot be suitably viewed, the viewing of an unsuitably image can be prevented, thereby improving viewer's convenience at the time of viewing stereoscopic images.

DETAILED DESCRIPTION

Figure 1:
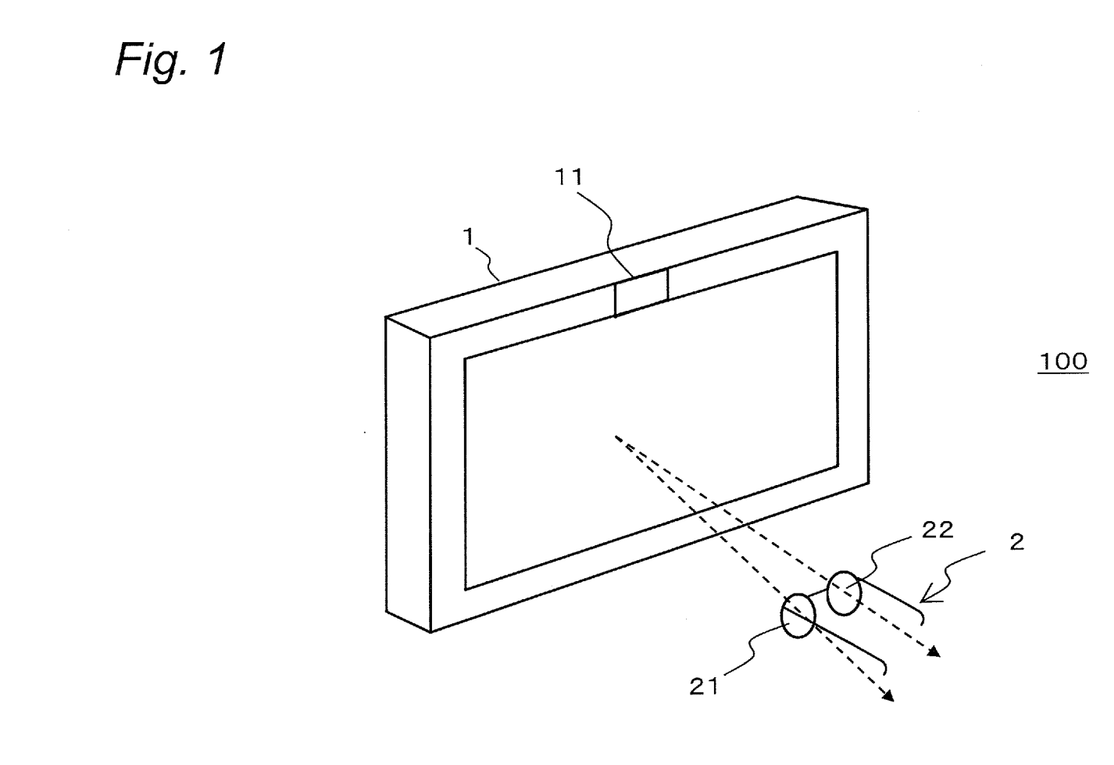
FIG. 1 is a view showing a configuration of a stereoscopic image display system according to a first embodiment.

Embodiments of the present disclosure are described below with reference to the accompanying drawings.
First Embodiment
1. Configuration of Stereoscopic Image Display System FIG. 1 shows a configuration of a stereoscopic image display system according to a first embodiment. A stereoscopic image display system 100 includes a stereoscopic image display device 1 for displaying a stereoscopic image, and stereoscopic image viewing eyewear (hereinafter, referred to as "3D eyewear") 2 for receiving a synchronizing signal from the stereoscopic image display device 1 and controlling open/close of left and right shutters to cause a viewer to view a stereoscopic vision.

The stereoscopic image display device 1 can display an image for enabling viewing of a stereoscopic image through the 3D eyewear 2 (hereinafter, referred to as "3D image"). When a 3D image is displayed, the stereoscopic image display device 1 displays a left-eye image and a right-eye image alternately on the screen. The stereoscopic image display device 1 can also display a non-stereoscopic image.

The 3D eyewear 2 has a shutter 21 that can shut a visual field of a viewer's left eye, and a shutter 22 that can shut a visual field of a viewer's right eye. The 3D eyewear 2 controls the shutters 21 and 22 to shut the visual field of the right eye when a left-eye image is displayed on the stereoscopic image display device 1, and to shut the visual field of the left eye when a right-eye image is displayed on the stereoscopic image display device 1. When a screen showing the left-eye image is displayed on the stereoscopic image display device 1, the viewer views the image with the left eye. When a screen showing the right-eye image is displayed on the stereoscopic image display device 1, the viewer views an image with the right eye. As a result, the viewer can view images sequentially displayed on the stereoscopic image display device 1 as a stereoscopic image.

Figure 2:
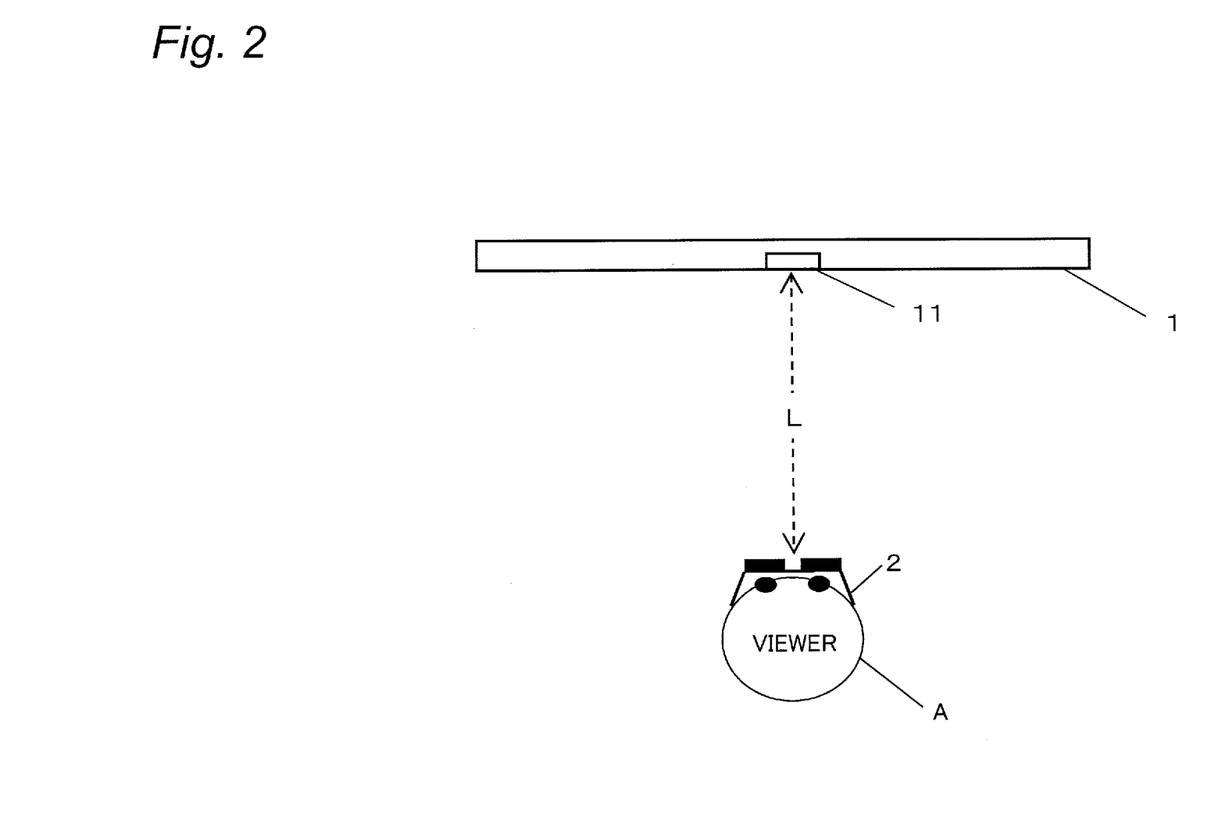
FIG. 2 is a diagram describing a positional relationship between a stereoscopic image display device and a viewer A.

FIG. 2 is a diagram describing a positional relationship between the stereoscopic image display device 1 and the viewer A. The 3D eyewear 2 according to the embodiment detects a distance L between the stereoscopic image display device 1 and the viewer wearing the 3D eyewear 2. When the distance L is smaller than a predetermined value, the left and right shutters are controlled to cause the viewer to view a non-stereoscopic image even though the stereoscopic image display device 1 performs a display operation for enabling viewing the viewing of the stereoscopic image. A configuration and an operation of the 3D eyewear 2 according to the embodiment are described in detail below.
2. Configuration and Operation of Stereoscopic Image Viewing Eyewear (3D Eyewear)

Figure 3:
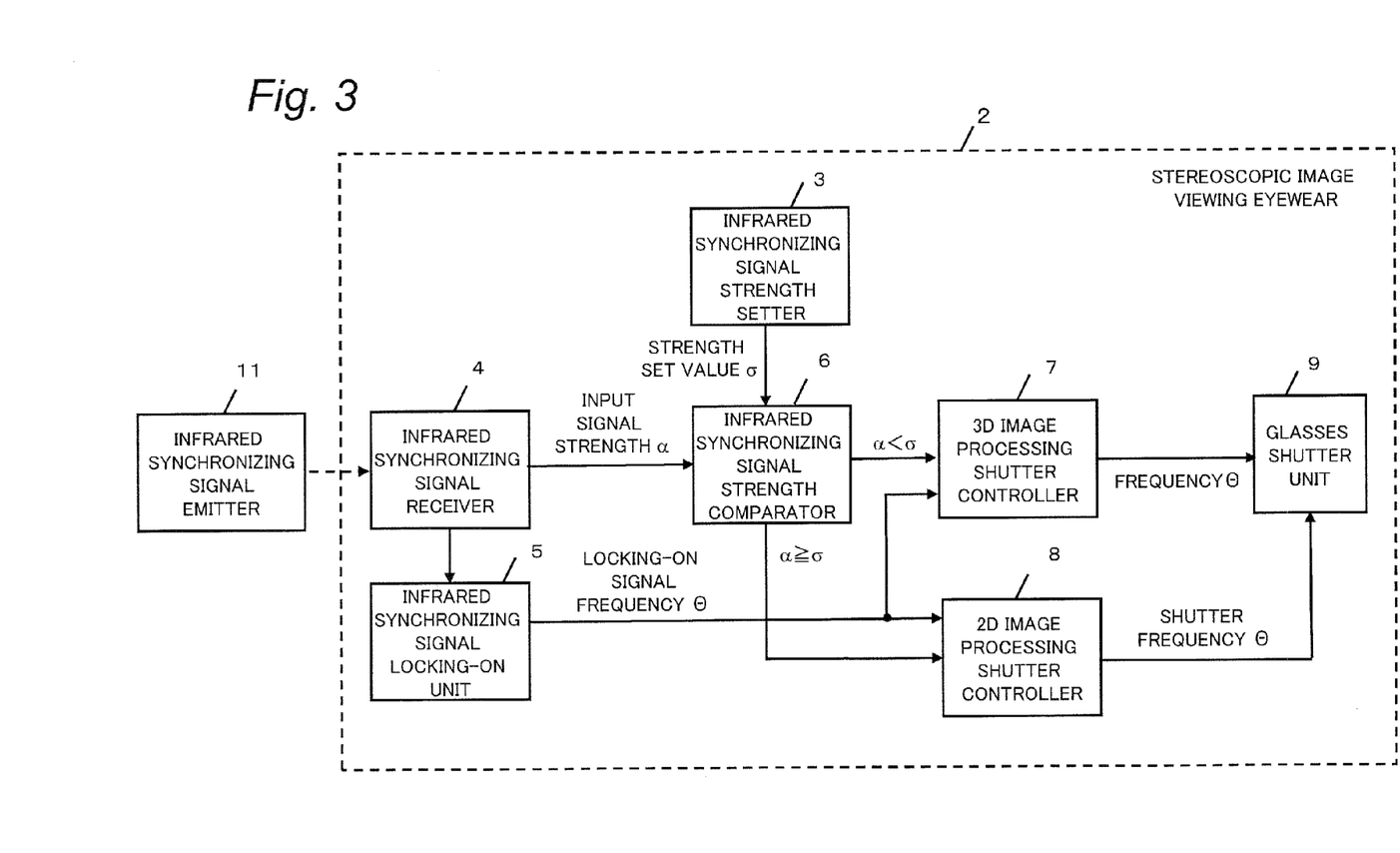
FIG. 3 is a diagram showing a configuration of stereoscopic image viewing eyewear (3D eyewear) according to the first embodiment.

FIG. 3 shows a configuration of the 3D eyewear 2 according to the embodiment. The 3D eyewear 2 has an infrared synchronizing signal receiver 4, an infrared synchronizing signal strength setter 3, an infrared synchronizing signal strength comparator 6, a 3D image processing shutter controller 7, a glass shutter unit 9, an infrared synchronizing signal locking-on unit 5 for synchronizing with and locking an infrared synchronizing signal, and a 2D image processing shutter controller 8. The glass shutter unit 9 includes a left-eye shutter 21 (a shutter for left-eye) and a right-eye shutter22 (a shutter for right-eye) that are opened or closed to control the visual fields of the viewer's left eye and right eye.

An infrared synchronizing signal is output by an infrared synchronizing signal emitter 11 provided to a device outside the 3D eyewear 2. In this embodiment, the infrared synchronizing signal emitter 11 is provided to a front surface of the stereoscopic image display device 1 as shown in FIGS. 1 and 2 by way of example. The infrared synchronizing signal emitter 11 outputs the infrared synchronizing signal in synchronization with a left-eye image and a right-eye image that are alternately displayed in 3D image display.

The operation of the 3D eyewear 2 is described. The infrared synchronizing signal output from the infrared synchronizing signal emitter 11 of the stereoscopic image display device 1 propagates through space, and is received by the infrared synchronizing signal receiver 4 of the 3D eyewear 2. The infrared synchronizing signal receiver 4 converts an input infrared ray into an electric signal, and calculates strength of the received infrared ray, namely, input signal strength $\alpha$ based on the electric signal. The infrared synchronizing signal receiver 4 outputs the calculated input signal strength $\alpha$ to the infrared synchronizing signal strength comparator 6.

The infrared synchronizing signal strength setter 3 has information about a set value $\sigma$ of predetermined strength that is set in advance or set by a user or the like. This strength set value σ is used for determining a level of the input signal strength α in the infrared synchronizing signal strength comparator 6 which is described later.

The infrared synchronizing signal locking-on unit 5 has a synchronization lead-in circuit such as a PLL, and generates a synchronizing signal (lock-on signal) for making the open/close of the shutter control synchronize with the synchronizing signal transmitted by the received infrared ray. A frequency of the lock-on signal at that time is determined as θ.

The infrared synchronizing signal strength comparator 6 compares the strength set value σ provided from the infrared synchronizing signal strength setter 3 with the input synchronizing signal strength α provided from the infrared synchronizing signal receiver 4, and outputs a compared result.

Figure 4:
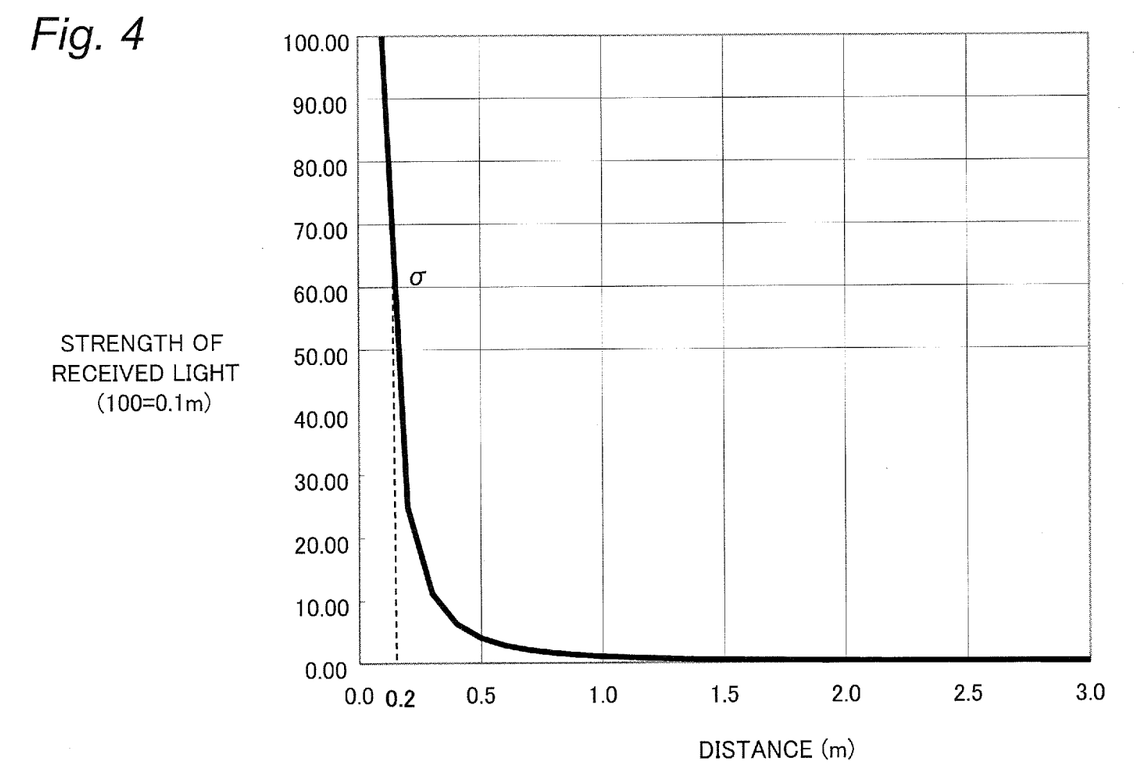
FIG. 4 is a diagram showing a relationship between a distance from the stereoscopic image display device to the 3D eyewear and strength of received light of a synchronizing signal.

FIG. 4 is a diagram showing a relationship between the strength α of the infrared synchronizing signal received by the infrared synchronizing signal receiver 4 and a distance from the infrared synchronizing signal emitter 11 to the infrared synchronizing signal receiver 4. As shown in FIG. 4, the longer the distance between the infrared synchronizing signal emitter 11 and the infrared synchronizing signal receiver 4 becomes, the smaller the strength of the infrared synchronizing signal received by the infrared synchronizing signal receiver 4 becomes. Therefore, the distance between the infrared synchronizing signal emitter 11 and the infrared synchronizing signal receiver 4 can be determined based on the strength of the infrared synchronizing signal received by the infrared synchronizing signal receiver 4. In this embodiment, the strength α of the synchronizing signal provided from the infrared synchronizing signal receiver 4 is compared with the strength set value σ provided from the infrared synchronizing signal strength setter 3, to determine whether the distance between the infrared synchronizing signal emitter 11 and the infrared synchronizing signal receiver 4 is larger than a predetermined distance.

The strength set value σ provided by the infrared synchronizing signal strength setter 3 is set to a value that is equal to the strength of the synchronizing signal received by the infrared synchronizing signal receiver 4 when the distance between the infrared synchronizing signal emitter 11 and the infrared synchronizing signal receiver 4 is the predetermined distance m. Hence, when the input synchronizing signal strength α is lower than the strength set value σ, it can be determined that the distance between the infrared synchronizing signal emitter 11 and the infrared synchronizing signal receiver 4 is larger than the predetermined distance m. On the contrary, when the input synchronizing signal strength α is larger than the strength set value σ, it can be determined that the distance between the infrared synchronizing signal emitter 11 and the infrared synchronizing signal receiver 4 is smaller than the predetermined distance m. In such a manner, it can be determined whether the distance between the infrared synchronizing signal emitter 11 and the infrared synchronizing signal receiver 4 is larger than the predetermined distance m according to the compared result output from the infrared synchronizing signal strength comparator 6. The strength set value σ is determined according to a desired predetermined distance in the following manner with reference to FIG. 4, for example. When the predetermined distance is set to 0.2 m, the receiving strength of the infrared ray with respect to the distance of 0.2 m is about 60. For this reason, the strength set value σ may be set to 60.

When the infrared synchronizing signal strength comparator 6 determines that the input synchronizing signal strength α is lower than the strength set value σ, namely, the distance between the infrared synchronizing signal emitter 11 and the infrared synchronizing signal receiver 4 is larger than the predetermined distance m, the 3D image processing shutter controller 7 alternately opens and closes the left and right shutters 21 and 22 of the glass shutter unit 9 in synchronization with left and right images that are alternately displayed on the stereoscopic image display device 1. More specifically, when the stereoscopic image display device 1 displays a left-eye image, the 3D image processing shutter controller 7 increases a quantity of light transmitting through the left-eye shutter 21 of the glass shutter unit 9 and decreases a quantity of light transmitting through the right-eye shutter 22. Further, when the stereoscopic image display device 1 displays a right-eye image, the 3D image processing shutter controller 7 decreases the quantity of light transmitting through the left-eye shutter 21 of the glass shutter unit 9 and increases the quantity of light transmitting through the right-eye shutter 22. This control allows the viewer who wears the 3D eyewear 2 to perceive a stereoscopic image.

When the infrared synchronizing signal strength comparator 6 determines that the input synchronizing signal strength α is equal to or lager than the strength set value σ, namely, the distance between the infrared synchronizing signal emitter 11 and the infrared synchronizing signal receiver 4 is equal to or less than the predetermined distance m, the 2D image processing shutter controller 8 controls the right and left shutters of the glass shutter unit 9 to open or close simultaneously. More specifically, when the stereoscopic image display device 1 displays a left-eye image, the 2D image processing shutter controller 8 increases the quantities of light transmitting through the left and right shutters 21 and 22 of the glass shutter unit 9 (the left and right shutters 21 and 22 are opened). On the contrary, when the stereoscopic image display device 1 displays a right-eye image, the 2D image processing shutter controller 8 reduces the quantities of light transmitting through the left and right shutters 21 and 22 of the glass shutter unit 9 (the left and right shutters 21 and 22 are closed). This control of the open/close of the shutters allows the viewer to view only the left-eye image, resulting in viewing of a non-stereoscopic image.

When the viewer who wears the 3D eyewear 2 gets too near to the stereoscopic image display device 1 (when the distance between the stereoscopic image display device 1 and the image viewing eyewear 2 is equal to or less than the predetermined distance m), the image viewing eyewear 2 automatically stops providing of the stereoscopic image to the viewer, to cause the viewer to view a non-stereoscopic image. As a result, even when the viewer gets too near to the stereoscopic image display device 1 to exceed a stereoscopic viewable range, an image can be suitably viewed.

The above description refers to the case where when the stereoscopic image display device 1 displays a left-eye image, the right and left shutters of the glass shutter unit 9 are simultaneously opened (the quantity of transmitting light is increased) by way of example, but the present disclosure is not limited to this. On the contrary, when the stereoscopic image display device 1 displays a right-eye image, the right and left eye-glass shutters of the glass shutter unit 9 may be simultaneously opened.

Figure 5:
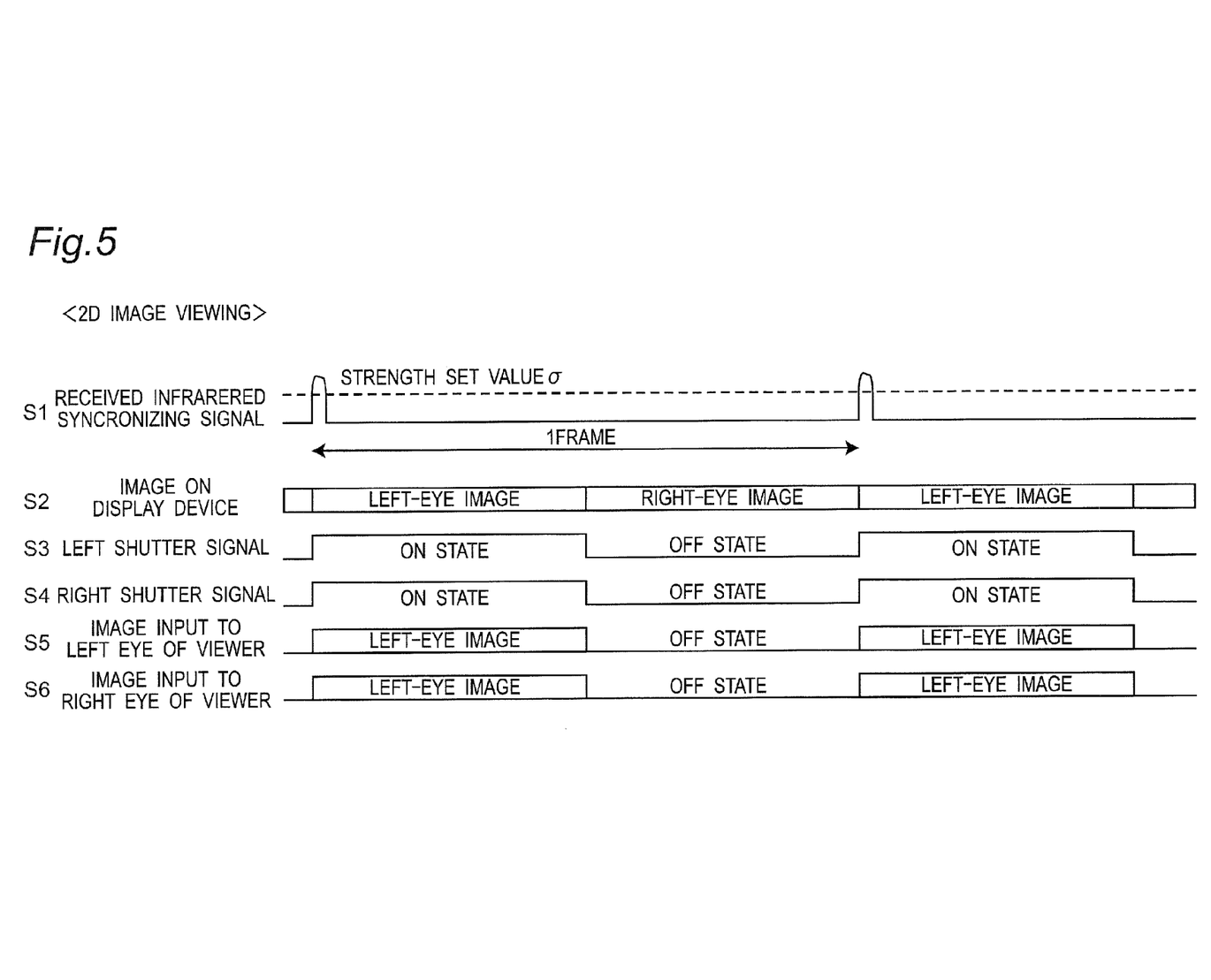
FIG. 5 is a timing chart showing various control signals in the 3D eyewear (at the time when limiting viewing of a stereoscopic image).
Figure 6:
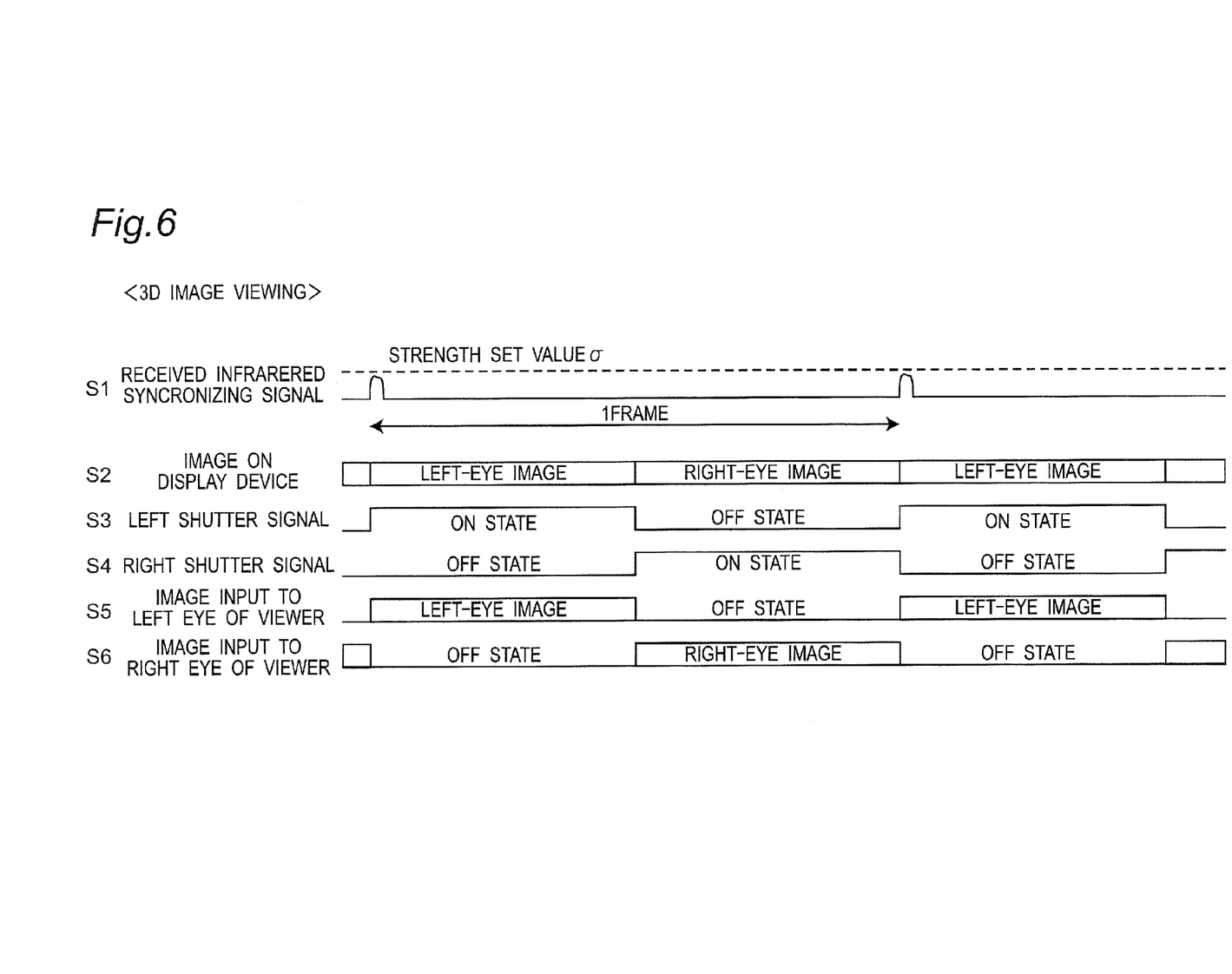
FIG. 6 is a timing chart showing various control signals in the 3D eyewear (a stereoscopic image can be viewed)

FIGS. 5 and 6 are timing charts each showing various control signals in the 3D eyewear 2 according to this embodiment. FIG. 5 is a timing chart showing a case where when the input synchronizing signal strength α exceeds the strength set value σ, the 2D image processing shutter controller 8 simultaneously controls the left and right shutters 21 and 22 to ON (open) and OFF (close) in synchronization with the left-eye image. FIG. 6 is a timing chart showing a case where when the input synchronizing signal strength α is smaller than the strength set value σ, the 3D image processing shutter controller 7 alternately controls the left and right shutters 21 and 22 to ON (open) in synchronization with the right and left-eye images.

In FIGS. 5 and 6, S1 shows the infrared synchronizing signal received from the stereoscopic image display device 1 by the 3D eyewear 2. S2 shows an image displayed on the stereoscopic image display device 1 (the left-eye image or the right-eye image).

S3 shows a time change of a control signal for controlling the open/close state of the left-eye shutter 21 of the glass shutter unit 9. S4 shows a temporal change of a control signal for controlling the open/close of the right-eye shutter 22 of the glass shutter unit 9.

S5 shows types of images viewed by the viewer's left eye with the 3D eyewear 2 in chronological order. S6 shows types of images viewed by the viewer's right eye with the 3D eyewear 2 on time-base axis.

When the input synchronizing signal strength (the strength of the received infrared ray synchronizing signal) α calculated by the infrared synchronizing signal receiver 4 is larger than the strength set value σ, as shown in FIG. 5, the 2D image processing shutter controller 8 simultaneously controls both a left-eye shutter signal and a right-eye shutter signal to the ON state or the OFF state in synchronization with display of the left-eye image of the images displayed on the stereoscopic image display device 1. This control allows the viewer's right and left eyes to view only the left-eye image. As a result, the viewer views the image displayed on the stereoscopic image display device 1 as not the stereoscopic image (3D image) but a non-stereoscopic image (2D image).

With this control, when the viewer gets too near to the stereoscopic image display device 1 within a suitable distance, the 3D eyewear 2 automatically stops the viewing of the stereoscopic image. For this reason, only when the viewer is within a distance range suitable for the viewing of the stereoscopic image, the viewer can view the stereoscopic image.

On the other hand, when the input synchronizing signal strength α calculated by the infrared synchronizing signal receiver 4 is smaller than the strength set value σ, as shown in FIG. 6, the 3D image processing shutter controller 7 controls the left-eye shutter signal and the right-eye shutter signal to the ON state alternately in synchronization with the left-eye image and the right-eye image displayed on the stereoscopic image display device 1. As a result, the viewer's left eye views only the left-eye image, and the right eye views only the right-eye image. As a result, the viewer views (the image) displayed on the stereoscopic image display device 1 as a 3D image.

With this control, when the viewer views an image in a suitable distance range with respect to the stereoscopic image display device 1, the 3D eyewear 2 enables the stereoscopic image to be viewed. For this reason, when the viewer is within the suitable distance range for the viewing of the stereoscopic image, the viewer can view the stereoscopic image.

3. Conclusion

The 3D eyewear 2 according to the embodiment enables the viewer to view a stereoscopic image based on an image displayed on the stereoscopic image display device 1. The 3D eyewear 2 includes the left-eye shutter 21, the right-eye shutter 22, the infrared synchronizing signal strength comparator 6, the 3D image processing shutter controller 7, and the 2D image processing shutter controller 8. The left-eye shutter 21 controls a visual field of the viewer's left eye, and the right-eye shutter 22 controls a visual field of the viewer's right eye. The infrared synchronizing signal strength comparator 6 detects the distance between the stereoscopic image display device 1 and the 3D eyewear 2, and determines whether the detected distance (the input signal strength α) is smaller than the predetermined value (the strength set value σ). The 3D image processing shutter controller 7 controls the open/close of the left-eye shutter and the right-eye shutter based on the determined result of the infrared synchronizing signal strength comparator 6 to cause the viewer to view the stereoscopic image when the detected distance is larger than the set value. The 2D image processing shutter controller 8 controls the open/close of the left-eye shutter and the right-eye shutter to cause the viewer to view a non-stereoscopic image when the detected distance is smaller than the predetermined value.

The 3D eyewear 2 according to the embodiment determines whether the distance between the stereoscopic image display device 1 and the 3D eyewear 2 (namely, the viewer) is suitable for viewing the stereoscopic image based on the synchronizing signal output from the stereoscopic image display device 1. Only when the determination is made as suitable, the left and right shutters are controlled so that the viewer views the stereoscopic image.

Other Embodiments

The above describes one embodiment of the present disclosure, but specific aspects of the present disclosure are not limited to the above embodiment. Other embodiments of the present disclosure are described below.

In the first embodiment, the distance between the stereoscopic image display device 1 and the 3D eyewear 2, namely, the viewer, is detected based on the light strength of the received infrared synchronizing signal. The method for detecting the distance between the stereoscopic image display device 1 and the 3D eyewear 2 (namely, the viewer) is not limited to this method. For example, a radio signal may be used instead of the infrared signal. In this case, the stereoscopic image display device 1 transmits a radio signal including predetermined information (for example, time information or open/close information about the 3D shutter). The 3D eyewear 2 communicates a predetermined distance detection code with the stereoscopic image display device 1 in a predetermined distance at the time of pairing setting with the stereoscopic image display device 1, and stores the time for the communication at that point as a reference value. Thereafter, the predetermined distance detection code is communicated between the stereoscopic image display device 1 and the 3D eyewear 2 at predetermined time intervals to obtain the time for the communication. This obtained time is compared with the above reference value to detect the distance between the stereoscopic image display device 1 and the 3D eyewear 2, namely, the viewer. Alternatively, another distance measuring method (means) that is conventionally present can be also used. In other word, when the distance between the stereoscopic image display device 1 and the 3D eyewear 2 can be detected, any distance measuring methods (means) can be used.

The strength set value σ set by the infrared synchronizing signal strength setter 3 is preferably set to a lower limit (minimum value) in the distance range where the viewer of a stereoscopic image can suitably view a stereoscopic image displayed by the stereoscopic image display device 1.

In the first embodiment, the strength set value σ is a fixed value, but the strength set value σ may be a variable value. That is, in the 3D eyewear 2, the strength set value σ may be changed.

Figure 7A:
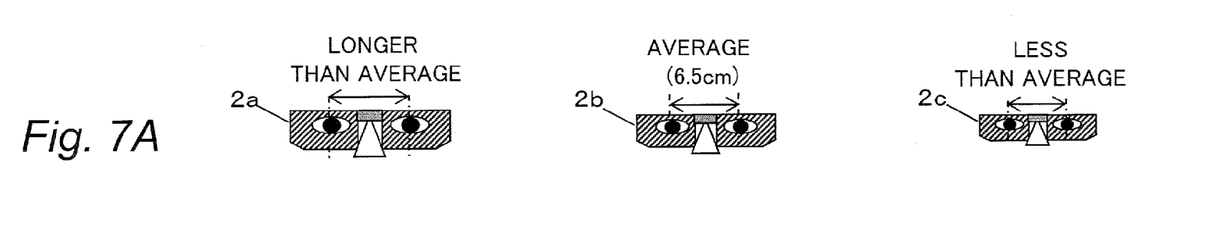
FIGS. 7A and 7B are views describing a position where a 3D object is viewed through three pairs of 3D eyewear having different sizes.

Further, plural 3D eyewear 2 having different sizes may be prepared, and different strength set values s may be set in the respective 3D eyewear. The size of the 3D eyewear refers to a distance between centers of the right and left glasses corresponding to a pupillary distance of the user of the 3D eyewear (the distance between pupillary centers of the right and left eyes). For example, as shown in FIG. 7A, three eyewear having different sizes may be prepared. In the example of FIG. 7A, the three 3D eyewear 2a, 2b, and 2c having large, middle, and small sizes are provided. The 3D eyewear 2b having the middle size is manufactured to have a distance between the centers of the right and left glasses corresponding to an average distance (6.5 cm) between pupils of average adult. The 3D eyewear 2a having large size is manufactured to have a distance between the centers of the right and left glasses larger than the distance between the centers of the right and left eyewear of the 3D eyewear 2b having middle size. The 3D eyewear 2c having small size is manufactured to have the distance between the centers of the right and left glasses smaller than the distance between the centers of the right and left eyewear of the 3D eyewear 2b having middle size. Benefits of preparing plural pairs of the 3D eyewear having different sizes are described below.

Figure 7B:
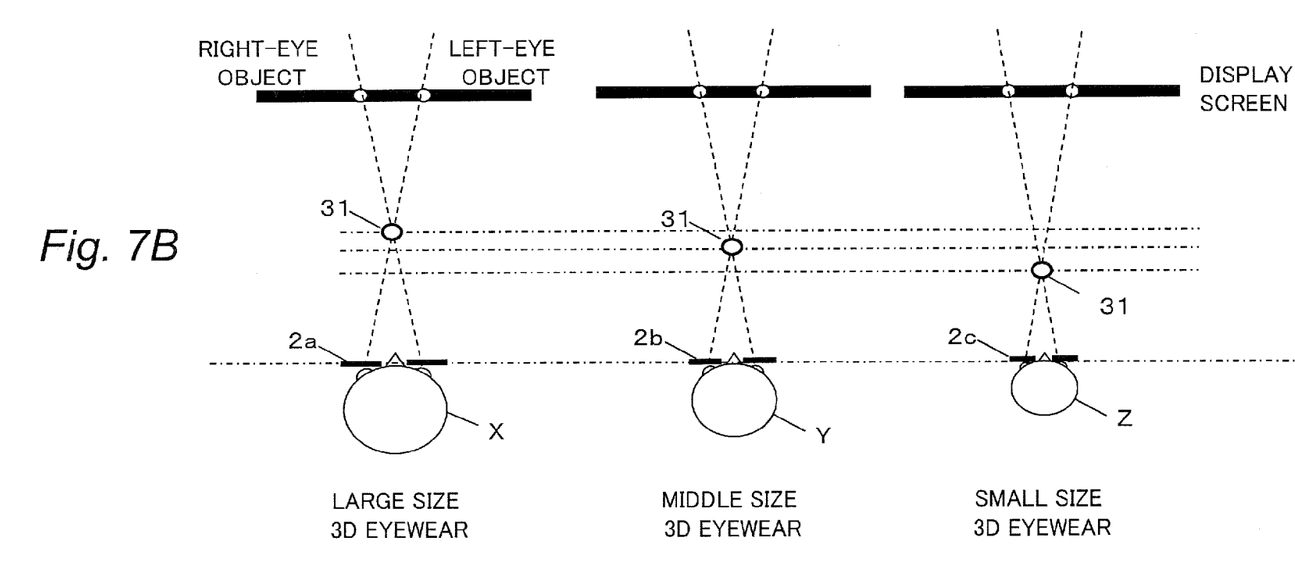

The child's pupillary distance is smaller than the adult's pupillary distance (the distance between the pupillary centers of the right and left eyes). In a case where the pupillary distance varies, a position of a stereoscopically-viewable object in a depth-wise direction varies even when images with the same parallax are viewed in the same position. FIG. 7B is a diagram describing the position of the object stereoscopically viewable by three viewers X, Y, and Z having different pupillary distances when the viewers view the object with the same parallax in the same viewing position. The pupillary distances of the viewers X, Y, and Z are larger in this order. As shown in FIG. 7B, the positions of the object 31 stereoscopically viewable by the viewers are farther from the display screen in order of the viewer Z, the viewer Y, and the viewer X. That is, as the pupillary distance is shorter, the object is viewed in the position nearer to the viewer.

For this reason, the minimum value of the distance up to the stereoscopic image display device 1 for enabling a stereoscopic image to be suitably viewed by a child who views an image same as that viewed by an adult becomes longer than that of the adult. Therefore, when the strength set value σ is set according to the pupillary distance of the viewer, namely, the size of the 3D eyewear, the control that is suitable for the pupillary distance of the viewer can be made. That is, the set signal σ for viewing an image through the 3D eyewear having smaller size is set to be larger than that for viewing the image through the 3D eyewear having larger sizes. Therefore, when a child whose pupillary distance is smaller views an image, the child views a stereoscopic image in a position that is farther from the stereoscopic image display device 1 than an adult, so that the child can be caused to view the stereoscopic image only within the viewing distance range suitable for the child.

Different sizes of the 3D eyewear allow the viewer to easily discriminate the 3D eyewear 2 for adult from one for child. The size variations of the 3D eyewear 2 are not limited to three. The size variations may be two or four or more. In that case, in the 3D eyewear, the strength set value σ is set to be larger as the size of the 3D eyewear is smaller.

The above configuration can automatically stop the viewing of a stereoscopic image when the viewer of the stereoscopic image gets too near to the stereoscopic image display device 1. Further, the method described in the embodiment can change the distance up to the stereoscopic image display device 1 for stopping the viewing of a stereoscopic image according to pupillary distances of viewers. As a result, a stereoscopic image can be viewed only in the range where the stereoscopic image can be suitably viewed according to the pupillary distances of viewers.

The above embodiment describes the pair of stereoscopic image viewing eyewear by way of example, but the disclosure of this application is not limited to this. For example, the disclosure of this application can be made similarly as the method for controlling the stereoscopic image viewing eyewear. At this time, the control method can be realized as a program processed by a computer or the like.

Examples of the disclosed technique are as follows.

First aspect: A first aspect of the present disclosure provides stereoscopic image viewing eyewear for enabling a viewer to view a stereoscopic image based on an image displayed on a display device. The eyewear includes a left-eye shutter that controls a visual field of a viewer's left eye, a right-eye shutter that controls a visual field of a viewer's right eye, a distance determiner that detects a distance between the display device and the eyewear and determines whether the detected distance is smaller than a predetermined value, and a shutter controller that controls open and close of the left-eye shutter and the right-eye shutter based on the determined result of the distance determiner to cause the viewer to view the stereoscopic image when the detected distance is larger than a predetermined value, and to cause the viewer to view a non-stereoscopic image when the detected distance is smaller than the predetermined value.

Second aspect: A second aspect of the present invention provides a method for controlling stereoscopic image viewing eyewear for enabling a viewer to view a stereoscopic image based on an image displayed on a display device. The stereoscopic image viewing eyewear include a left-eye shutter for controlling a visual field of a viewer's left eye and a right-eye shutter for controlling a visual field of a viewer's right eye. The method for controlling the stereoscopic image viewing eyewear includes detecting a distance between the display device and the eyewear, and determining whether the detected distance is smaller than a predetermined value. When the detected distance is larger than the predetermined value, open and close of the left-eye shutter and the right-eye shutter are controlled based on the determined result of the distance determiner to cause the viewer to view the stereoscopic image. On the other hand, when the detected distance is smaller than the predetermined value, the open and close of the left-eye shutter and the right-eye shutter are controlled to cause the viewer to view a non-stereoscopic image.

Third aspect: A third aspect of the present invention provides a stereoscopic image reproducing system including a display device for displaying an image for enabling a stereoscopic image to be viewed, and stereoscopic image viewing eyewear for enabling a viewer to view a stereoscopic image based on an image displayed on the display device. Each stereoscopic image viewing eyewear includes a left-eye shutter that controls a visual field of a viewer's left eye, a right-eye shutter that controls a visual field of a viewer's right eye, a distance determiner that detects a distance between the display device and the eyewear and determines whether the detected distance is smaller than a predetermined value, and a shutter controller that controls open and close of the left-eye shutter and the right-eye shutter based on the determined result of the distance determiner to cause the viewer to view the stereoscopic image when the detected distance is larger than a predetermined value, and to cause the viewer to view a non-stereoscopic image when the detected distance is smaller than the predetermined value. Each of stereoscopic image viewing eyewear has different distances between centers of a left-eye glass and a right-eye glass. As the distance between the centers of the left-eye glass and the right-eye glass is smaller, the predetermined value is set to a larger value.

The configuration of the third aspect enables a range in which a plurality of viewers having various pupillary distances view a stereoscopic image (in other words, a range where the viewing of the stereoscopic image is stopped) to be set to a suitable range according to the pupillary distances of the viewers.

INDUSTRIAL APPLICABILITY

The present disclosure can be applied to the stereoscopic viewing eyewear to be used together with the stereoscopic image display device in order to enable the viewer to view a stereoscopic image.

The invention claimed is:

1. A stereoscopic image reproducing system, comprising:
a display device that displays an image for enabling a stereoscopic image to be viewed; and
plural stereoscopic image viewing eyewear that enables a viewer to view the stereoscopic image based on the image displayed on the display device, wherein
each stereoscopic image viewing eyewear comprises:
   a left-eye shutter that controls a visual field of a viewer's left eye;
   a right-eye shutter that controls a visual field of a viewer's right eye;
   a distance determiner that detects a distance between the display device and the eyewear and determines whether the detected distance is smaller than a predetermined value; and
   a shutter controller that controls open and close of the left-eye shutter and the right-eye shutter based on the determined result of the distance determiner to cause the viewer to view the stereoscopic image when the detected distance is larger than a predetermined value, and to cause the viewer to view a non-stereoscopic image when the detected distance is smaller than the predetermined value,
each of stereoscopic image viewing eyewear has different distances between centers of a left-eye glass and a right-eye glass, and
as the distance between the centers of the left-eye glass and the right-eye glass is smaller, the predetermined value is set to a larger value;
wherein when the detected distance is smaller than the predetermined value, the shutter controller simultaneously controls the left-eye shutter and the right-eye shutter to open in synchronization with display of one of a left-eye image and a right-eye image, and simultaneously controls the left-eye shutter and the right-eye shutter to close in synchronization with display of the other image.

* * * * *